Feb. 6, 1940.  A. J. ST. GEORGE  2,189,478
FISHING DEVICE
Filed April 13, 1939
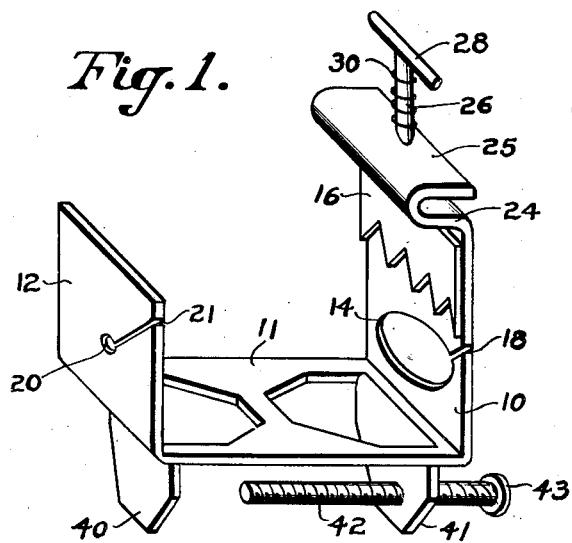
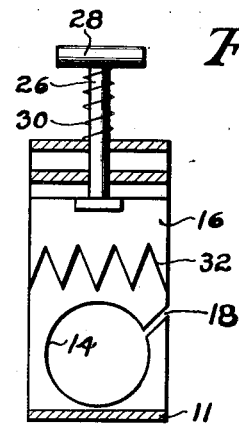
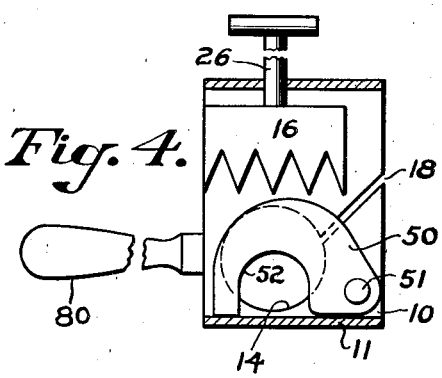
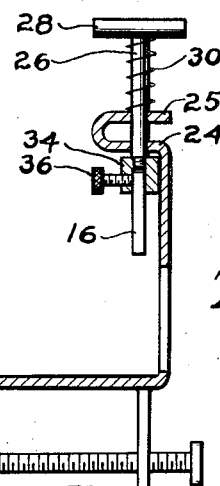
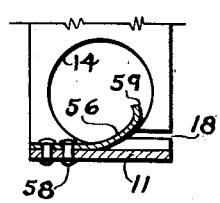
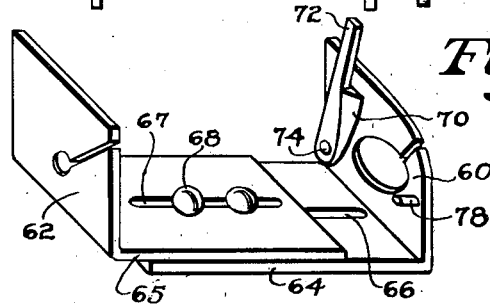
Witness:-
H. E. Covey
Inventor
Alfred J. St. George
By Clayton L. Jenks
Attorney Patented Feb. 6, 1940

2,189,478

UNITED STATES PATENT OFFICE 2,189,478

FISHING DEVICE

Alfred J. St. George, Millbury, Mass.

Application April 13, 1939, Serial No. 267,668

11 Claims. (Cl. 43—4)

This invention relates to fishing apparatus and more particularly to a device for holding and killing fish, such as eels and other aquatic animals, that have been caught on a fishline.

Fishermen frequently catch eels either intentionally or accidentally and are faced with the problem of removing the hook and killing the eel. The wriggling, slippery animal is difficult to hold, and it may succeed in tangling the line or otherwise giving the fisherman considerable trouble; hence many fishermen cut the line and allow the eel to escape with the hook. Similar problems may be met in handling other types of fish.

The primary object of this invention is to provide a device which is so constructed and arranged that after an eel, or other fish, has been caught on a fishing line, it may be drawn by the line into a position of confinement where it may be easily killed and the hook recovered. Further objects will be apparent in the following disclosure.

Referring to the drawing, in which like reference numerals indicate like parts:

Fig. 1 is a perspective view of one form of device embodying my invention;

Fig. 2 is a transverse section of a modification showing the mounting of the knife;

Fig. 3 is a longitudinal section of a different form showing a removable knife mounting;

Fig. 4 is a transverse section of a modification, which permits adjustment of the size of the opening adjacent to the cutter knife;

Fig. 5 is a fragmentary section showing a spring finger to close the slot for the fishline; and Fig. 6 is a perspective view of a further modification showing an extensible frame and a different form of frame.

One embodiment of my invention, as shown in Fig. 1, comprises a substantially U-shaped device having a standard 10 secured to a bottom plate 11 and a further standard 12 substantially parallel with the first. These parts are preferably made of sheet metal cut and bent as required. The standard 10 is provided with a hole 14 of sufficient size to admit the head of an eel or other fish that has been caught on the line. It is the main purpose of this device to draw the eel into that opening by means of the line on which he has been caught and then to kill the fish by means of the knife 16 suitably supported at one side of the opening 14. The standard 10 is provided with a slot 18 through which the fishline may be threaded and the standard 12 has also a small opening 20 therein communicating with the outside through a slot 21. The slots preferably slope upwardly as illustrated and they are so located that once the line has been threaded into the two openings 14 and 20 it will not be easily withdrawn therefrom by the wriggling motion of the eel. The standard 12 serves as a stop member to limit the distance through which the fish may be drawn and to position it properly so that the knife may strike it suitably, such as just in the rear of the head. Hence any suitable member arranged to guide the fishline may be used instead of the guide and stop plate 12 shown in the drawing.

The knife may be supported in various arrangements, such as by means of a pivot or a sliding member. For example, the top portion of the standard 10 may be bent to form a U-shaped portion comprising two horizontal shelves 24 and 25 (Figs. 1, 2 and 3) which are spaced apart and provided with aligned holes serving as bearings for the slidably mounted post 26 carrying the knife 16. A horizontal handle 28 is secured, as by screw threads or welding, to the upper end of the post 26 so that the knife may be manually operated. The knife is held in its uppermost or inoperative position by means of the compression spring 30 mounted between the shelf 25 and the underside of the handle 28.

The knife may be of various shapes, depending on the results desired. As shown in Figs. 1 and 2, it may be deeply serrated on its lower edge to provide spaced teeth 32 which are of such a length and so positioned relative to the bottom of the hole 14 and the base 11 that the pointed ends of these teeth will strike the base and stop further downward movement thereof before the head of the eel has been entirely severed. The hole 14 may extend to a point close to the bottom 11, as shown in Fig. 2 or it may be further spaced therefrom, as shown in Fig. 1. Various arrangements are, of course, feasible; and if desired, the serrated teeth 32 may be so arranged as to cut the head of the fish entirely off. It will also be understood that the length of the post 26 may be so selected that the handle 28 will strike the top of the standard 10 before the knife touches the bottom plate 11 or before it can pass entirely through the body of the fish; or it may permit free movement of the knife.

The knife blade 16 may be welded or otherwise rigidly secured to the handle, or it may be removably mounted on the bottom of the post 26, as shown in Fig. 3, in such a manner that it may be easily taken off and sharpened as required. A suitable construction comprises the U-shaped clip 34 suitably secured to the bottom of the post 26 as by being threaded thereon. This clip is also threaded for receipt of a thumb nut 36 adapted to engage the side of the removable knife blade 16 and press it against the back wall of the clip and thus hold it in place.

The device may be held by hand, or it may be secured to a suitable support, such as the side of a boat. For the latter purpose, as shown in Fig. 1, it is provided with two lugs 40 and 41 stamped out of the bottom 11 of the sheet metal and bent downwardly. One of these lugs 41 is threaded and provided with a screw 42 having a knurled head 43 thereon by means of which the end of the bolt 42 may be thrust forward to clamp the side of a boat between the bolt and the lug 40. If desired, these lugs 40 and 41, without the screw bolt 42, may be made long enough to be jabbed into the ground and thus serve as a support therefor. Other suitable means may be employed for the purpose of holding the device during use, such as the handle 80 (Fig. 4) suitably secured to one of the standards, so that a person may hold the device in one hand and manipulate the operating mechanism with the other.

A modification is shown in Fig. 4 which permits adjustment of the size of the opening through which the fish is drawn. To that end, the opening 14 may be made large enough to take the largest available fish, and an adjustment member 50 is provided which serves to make the effective opening smaller and thus to hold the fish fully confined. The plate 50 is hinged on a pin 51 suitably located on the upright standard 10. This plate is shaped to swing into position to cover part of the hole 14 and provide a smaller opening. That is, the plate is cut away at its lower portion along the semi-circular arc 52, and it is so mounted that when the plate 50 is swung down into the position shown in Fig. 4, this cut out portion 52 cooperates with the wall of the hole 14 to provide a desired small opening. The fishline may be threaded through the opening 18 in the wall 10 prior to the plate 50 being moved into position. The knife handle 26 will, of course, be made long enough so that the blade will reach the bottom of this opening. If desired, the opening 52 may be placed in the top of the plate 50 or otherwise suitably located.

In order to prevent the fishline from being drawn out through the openings 18 and 21, either or both of these slots may be provided with a spring clip 56 suitably mounted by rivets 58 on the bottom 11 of the casing, as shown in Fig. 5. This spring clip has an inwardly turned end 59, and the parts are so constructed and arranged that a fishline may be drawn in through the slot 18 on the standard 10 or the corresponding slot 21 of the other standard 12 and it will force the spring member 56 upwardly to permit the line to pass into the opening 14 or 20. For removing the line from this opening, it is merely necessary that the fishline be drawn into position between the inturned end 59 and the wall of the opening 14 and then pulled downwardly against the pressure of the spring until it reaches the slot 18. This construction makes it substantially impossible for the wriggling eel to get the line out of the opening, and its head will necessarily be positioned by the guide stop 12 in proper position for operation of the cutter 16.

As a further modification, the device may be made extensible in length, as indicated in Fig. 6. Here, the standards 60 and 62, which correspond with the standards 10 and 12 above described, are provided with inwardly turned bottom members or flanges 64 and 65, which are respectively provided with slots 66 and 67 through which a pair of bolts 68 are mounted with their heads and nuts engaging the top and bottom surfaces respectively of these two members. Hence, by loosening the nuts on these bolts, the two standards 60 and 62 may be moved closer together or farther apart, according to the size of eel that is prevalent in the pond being fished. This construction may be used with various arrangements of knife and other features as will be readily apparent.

It is within the scope of this invention to provide a knife which will entirely sever the head from the body, and for that purpose the serrated teeth may be omitted or the knife may be fashioned somewhat as an ordinary knife blade and hinged in place, as illustrated in Fig. 6. This knife comprises a sharp blade 70 having a handle 72 attached thereto, and the blade is pivotally mounted near its lower end on a pivot pin 74 suitably supported on the standard 60 which has one corner rounded to permit easy manipulation of the knife handle. The blade may be of such length and shape that it may be normally positioned against the bottom 64 of the device where it will not endanger the operator, but when it is to be used it is thrown back so as not to cover the opening in the standard. This knife may be arranged either to cut off the fish's head or a stop pin 78 may be provided to engage the handle 72 and prevent its going beyond a desired position.

The operation of each of the above described devices will be readily apparent. The device is small and compact and it may be easily carried by the fisherman and brought into use when needed. If an eel is caught, while one is fishing from either a boat or the bank of a lake or stream, it is merely necessary to secure the device in position or to hold it by hand and then thread the line into the two openings and draw the eel into position for operating the knife.

Numerous modifications will be readily apparent to one skilled in this art in view of the above disclosure, and the drawing and appended description are therefore to be considered as illustrating the principles of the invention as well as various modifications thereof, without limiting the scope of the invention except as set forth in the claims appended hereto.

Having thus described my invention, what I claim and desire to secure by Letters Patent is:

1. A fishing device comprising a standard having an opening therethrough for insertion of the head of a fish, means including a knife mounted on the standard for cutting into the fish thus held, a stop member spaced from and in line with said opening and means whereby a fish caught on a line may be drawn into said opening to the stop member which thus locates the fish head relative to the cutting device.

2. A fishing device comprising a member having an opening therethrough for insertion of the head of a fish, means including a stop whereby a fish caught on the line may be drawn for a predetermined distance through said opening, a knife, a resilient support therefor and means for operating the knife, said parts being so constructed and arranged that the knife may be operated to cut only part way through the body of the fish.

3. A fishing device comprising a wall having a large slotted opening to receive the head of a fish, a standard having means for guiding a fishline for drawing the head of a fish through the opening, a knife mounted adjacent to said opening and means for operating the knife to kill the fish.

4. A fishing device comprising a standard having an opening therethrough for receiving the head of a fish, a second standard spaced therefrom and arranged to receive and guide a fishline to draw the fish head through said opening to a predetermined distance, a knife mounted adjacent said opening and means for operating the knife to kill the fish, said knife having a serrated blade and being so constructed and arranged that the body of the fish cannot be severed.

5. A fishing device comprising a wall having an opening through which the head of a large fish may be drawn, means for diminishing the size of the opening for receiving a smaller fish and means including a knife for killing a fish which has been drawn into said opening.

6. A fishing device comprising a base having two spaced standards thereon, means for removably securing the base on a support, one standard having a large slotted opening therethrough and the other a smaller slotted opening which are so constructed and arranged that the head of a fish caught on a line may be drawn through the large opening for a distance limited by the other standard and means including a knife for killing the fish thus held.

7. A fishing device comprising a member having a hole therethrough and a slot into which a fishline may be laterally threaded, a member which guides the line so that the head of a fish may be drawn into said hole, means including a knife for killing a fish thus held and means for preventing accidental escape of the line through said slot.

8. A fishing device comprising a member having a hole therethrough and a slot into which a fishline may be laterally threaded, a standard spaced from said member having a slotted opening for guiding a line whereby the head of a fish may be drawn through the hole, means including a knife for killing a fish thus held and a spring finger so shaped and arranged as to cover the slot and prevent the accidental escape of the fishline therethrough but which may be forcibly lifted to permit the line to enter or be withdrawn.

9. A fishing device comprising two standards, one having an opening therethrough for admission of the head of a fish and the other forming a guide for a fishline whereby a fish head may be drawn through said opening and means including an extensible base for adjusting the distance between said standards.

10. A fishing device comprising two standards, one having an opening therethrough for admission of the head of a fish and the other forming a guide for a fishline whereby a fish head may be drawn through said opening, a knife for killing the fish mounted adjacent said opening and means including an extensible base for adjusting the distance between said standards.

11. A fishing device comprising a base having two substantially parallel standards projecting therefrom, one of the standards having a large hole and slot communicating therewith for the reception of a fishline and the head of a fish, and the other having a guiding slot for said line, means for supporting the base, a knife positioned near said hole, and a resiliently mounted support arranged to move the knife and kill the fish, said knife having a serrated edge and the base and hole being so arranged that the knife strikes the base without severing the head of the fish.

ALFRED J. ST. GEORGE.